(12) United States Patent
Oliver

(10) Patent No.: US 6,256,778 B1
(45) Date of Patent: Jul. 3, 2001

(54) OCTET ITERATOR TEMPLATE INTERFACE FOR PROTOCOL TRANSFER SYNTAX CODING SERVICES

(76) Inventor: Christopher Oliver, 824 S. Monterey Ave. Apt B, Monrovia, CA (US) 91016

( * ) Notice: Subject to any disclaimer, the term of this patent is extended or adjusted under 35 U.S.C. 154(b) by 0 days.

(21) Appl. No.: 08/777,750

(22) Filed: Dec. 21, 1996

(51) Int. Cl.[7] ............................................ G06F 9/45
(52) U.S. Cl. ............................................................ 717/5
(58) Field of Search .................................. 395/705; 717/5

(56) References Cited

U.S. PATENT DOCUMENTS

| | | |
|---|---|---|
| 4,994,998 | 2/1991 | Anezaki . |
| 5,210,535 | 5/1993 | Fujita . |
| 5,263,137 | 11/1993 | Anezaki . |
| 5,418,963 | 5/1995 | Anezaki et al. . |
| 5,418,972 | 5/1995 | Takeuchi et al. . |
| 5,649,227 * | 7/1997 | Anezaki et al. ................. 395/800.01 |
| 5,778,360 * | 7/1998 | Sugita et al. ............................ 707/4 |

OTHER PUBLICATIONS

International Standard, ISO/IEC IS 8824, "Information Technology—Abstract Syntax Notation One (ASN.1)–Specification of Basic Notation," International Organization for Standardization, Project JTC1.21.17, ITU–T Recommendation X.680, Jul. 1994.

Stahl et al., A Conceptual Mapping of the GSM 12.20 Managed Objects . . . , 1991, p.349–365.*

Tantiprasut, ASN.1 Protocol Specification for use with Arbitrary Encoding Schemes, 1997, p.502–513.*

Koenig, A., Generic Input Iterators, Mar.–Apr. 1996, pp. 72, 74–75 (abstract provided).*

* cited by examiner

Primary Examiner—Emanuel Todd Voeltz
Assistant Examiner—John Q. Chavis
(74) Attorney, Agent, or Firm—Hogan & Hartson, LLP

(57) ABSTRACT

A method is disclosed that allows the concise implementation of one protocol encoding/decoding device for syntax conversion between an abstract data syntax and a transfer syntax presented in an open-ended variety of input/output/storage mediums, including, but not limited to random-access memory, disk files, communications sockets, buffer lists, and other static or dynamically-extensible storage structures. The abstract syntax is described using the Abstract Syntax Notation One standard and presented in a higher-level object-oriented programming language such as C++. The transfer syntax is specified by standardized encoding rules and results in a stream of octets (unsigned 8-bit characters) suitable for communication transport using the Open Systems Interconnection (OSI) protocol model. The result of encoding (which is also the input for decoding) is called a protocol data unit (PDU). For different applications, it may be useful to present the PDU using various input/output or storage mediums such as listed above. The disclosed method employs a template function on an octet output iterator interface to provide an ASN.1 encoding mechanism, and a corresponding template function parameterized on an octet input iterator interface to provide an ASN.1 decoding mechanism, both independent of the medium in which the PDU is presented.

20 Claims, 6 Drawing Sheets

| |
|---|
| class ASN1Data; —C++ representation of abstract data |
| class ASN1Type; —metadata describing the type of the data |
| class ASN1CodingControl; —flags to control coding options |
| |
| template<class OutputIterator>—forward octet output |
| bool |
| encode(const ASN1Data&,    —abstract data<br>    const ASN1Type&,   —metadata(syntax description)<br>    const ASN1CodingControl&,   —options flags<br>    OutputIterator output);   —transfer medium access |
| |
| template<class InputIterator>—forward octet input |
| Status |
| Decode(InputIterator input,  —access to transfer medium<br>    ASN1Data&    —abstract data to be produced<br>    const ASN1Type&,   —metadata(syntax description)<br>    const ASN1CodingControl&);—options flags |
| |

FIG.7

OCTET ITERATOR TEMPLATE INTERFACE FOR PROTOCOL TRANSFER SYNTAX CODING SERVICES

FIELD OF THE INVENTION

The invention relates generally to the field of Open Systems Interconnection (OSI) data communications software, and more particularly, to a mechanism for translating between an abstract data syntax and a transfer syntax to support the passing of data between computers of various types.

BACKGROUND OF THE INVENTION

The International Telecommunications Union (ITU, formerly the CCITT) and the International Organization for Standardization (ISO) have promulgated a series of joint recommendations to standardize a seven-layer OSI protocol model to allow the communication of application data among heterogeneous computers in a uniform manner. The seven layers comprise a physical layer, a data link layer, a network layer, a transport layer, a session layer, a presentation layer, and an application layer.

These recommendations include the specification of Abstract Syntax Notation One (ASN.1), a standardized notation for describing application layer data structures. ASN.1 is documented in ISO 8824 | CCITT Rec. X.208, later revised in ISO 8824-1 and ITU-T Recs. X.680 through X.683. A set of data types expressed in ASN.1 is called an abstract syntax, and it structures the communication of information between two systems at the application layer. The syntax is abstract because it is independent of its physical representation in a real system. In order to be communicated, an abstract syntax datum must be translated into a transfer syntax having a specific physical representation, which is then presented to the presentation layer for transport to the remote system. A discrete unit of encoded information is called a protocol data unit (PDU). This translation process is called encoding. On the remote system, the inverse process, decoding, takes place when the presentation layer presents an incoming PDU to the application layer, which decodes it into the abstract syntax.

The joint ITU-T/ISO recommendations also include a series of encoding rules for transforming abstract data syntaxes expressed in ASN.1 into transfer syntax suitable for communication between OSI protocol machines. Data exchange agreements expressed using ASN.1, when implemented in software using the specified encoding rules to present the data to an OSI protocol machine, allow successful interoperation between different types of computers across a network. The encoding rules are specified in ISO 8825 | CCITT Rec. X.209, later revised in ISO 8825-1 and ITU-T Recs. X.690 through X.691.

Systems based on ASN.1 data exchange agreements are being deployed widely in the telecommunications industry, where the standard was pioneered, and other industries, including aviation and electronic commerce. For example, ASN.1 is used for avionics control in the Boeing 777, in ground-to-air communications systems, and the secure electronic transaction standard for Mastercard and VISA. While designed for data communication, the method is also suitable for data storage. For example, the National Institute of Health is using ASN.1 to specify storage of human genome data on CD-ROM.

The prior art includes a variety of methods for implementing the ASN.1 encoding rules. Some of these methods involve the translation of data directed by metadata, that is, auxiliary data that describes the structure of the data itself. One example is that described in Anezaki et al., U.S. Pat. No. 5,418,963. Other methods involve an ASN.1 compilation process that generates software routines to translate particular ASN.1 data types, such as the Retix ASN.1 Compiler (sold by Retix Corporation of Santa Monica, Calif.) or the OSS ASN.1 Compiler (sold by Open Systems Solutions, Inc., of Princeton, N.J.).

However, none of the prior art systems employ a consolidated method capable of supporting a variety of output forms for the encoding. In many cases, the encoding methods require the output to be packaged into a contiguous block of pre-allocated memory (e.g., Anezaki). This mechanism has two notable limitations. The first is that the application is burdened with the task of pre-determining an appropriate amount of memory to store the PDU and of pre-allocating the memory. The second is that if the application ultimately needs to present the PDU in a form other than contiguous memory (e.g., disk file, socket, or other data structure), then it is forced to encode the pre-allocated block of data back into memory, and then copy it out of memory into the ultimate presentation medium. This two pass process is inefficient, requiring more computing resources and taking more time.

Consequently, it is desirable to create an open-ended encoding/decoding technique that directly supports a variety of output forms, avoiding the need for additional application processing. It is further desirable to permit encoding without the need to predetermine the size of the memory block.

The present invention builds upon two prior-art general programming techniques, template functions and iterator interfaces. Both were developed and used for different applications. A template function is a technique first introduced in the mid-1980's in programming languages such as Ada and C++. The template mechanism allows a function, class or package to be defined leaving one or more necessary parameterized type definition unspecified until it is compiled. The source code that implements the template function uses the parameterized type and makes various assumptions about it, but the parameterized type is otherwise unknown to the function implementation. When the template function is used in application source code, the template parameters are filled in with particular types. Any type may be used, provided it meets the requirements of the implementation. For example, an implementation may require the parameterized type to support addition and multiplication operations. In this case, the parameter may be filled in by any integer, floating point type, or other user-defined type that supports addition and multiplication.

Iterator interfaces are a logical extension to the standard use of templates. They exist in various C++ standard libraries, most notably the Standard Template Library (STL) originally promulgated by Hewlett-Packard, which is now being adopted as part of the ANSI Standard for C++. As discussed above, the implementation imposes requirements on the types which may fill in its parameters, depending on the assumptions made in the implementation. The purpose of iterator interfaces is to standardize and classify the sorts of assumptions made by implementations to facilitate a consistent and coherent use among a library of related templates. This eliminates redundancy that would otherwise exist between various templates. In STL, a taxonomy of iterators is defined, with a standard set of assumptions associated with each type of iterator. Assumptions are arranged progressively, such that all iterators support a base set of assumptions, and higher forms of iterators may support additional assumptions.

For example, basic iterators may be either "forward" or "backward" iterators, meaning that they may access one element at a time in one direction only. Forward iterators support the "++" operator, and backward iterators support the "--" operator. Bi-directional iterators support both forward and backward operations. Random access iterators support all bi-directional operations, and they allow access of indexed elements (via the "[]" operator). The definition of these interfaces facilitates the creation of "containers," which are template classes that provide iterator interfaces, and "algorithms," template functions that operate on containers.

SUMMARY OF THE INVENTION

It is an object of the present invention to provide an encoding/decoding engine that directly supports an open-ended variety of input/output and storage media by combining the mechanisms of template functions and iterator interfaces with components for encoding and decoding abstract data (e.g., ASN.1 data). While templates and iterators have been used for containers (data storage/retrieval structures), the present inventions novel application to data communication, combined with an encoding/decoding component, permits the encoding of abstract data into transfer syntax directly into any transfer medium that provides an output iterator interface. This combination permits the encoding of abstract data into transfer syntax and directly transferring it onto any storage that provides an iterator interface. Consequently, the same encoding function may be coupled with an output iterator for memory, disk, socket, or other data structure to hold the encoding.

In the preferred embodiment, the encoding and decoding engines structure the transfer syntax as a stream of octets. An octet is an unsigned 8-bit character that is the common medium of exchange.

It is another object of the present invention to decouple the encoder from having to have any knowledge of the output structure. This is accomplished by templatizing the output parameter. Thus, any output medium that can meet the minimal requirements of the octet iterator interface can be supported, even output media not envisaged when the encoder is built. This combination alleviates the problems in prior art systems described above.

The present invention comprises a protocol encoding/decoding engine, template functions, and an octet iterator interface. The template functions are parameterized using the octet interface. Encoding functions use output octet iterators, while decoding functions use input octet iterators. The application invokes the encoding/decoding engine via the template functions. The encoding/decoding engine is implemented such that the assumptions it makes about its input/output do not exceed the requirements of the octet iterator interface. The decoding component should generally only employ dereference and increment operations on its input, while the encoding component should generally only employ dereference, increment, and assignment operations on its output.

BRIEF DESCRIPTION OF THE DRAWINGS

FIG. 7 illustrates a preferred embodiment of the present invention implemented in the C++ language.

DETAILED DESCRIPTION OF THE PREFERRED EMBODIMENT

1. Prior Art Encoding/Decoding Engines

Figure 1:
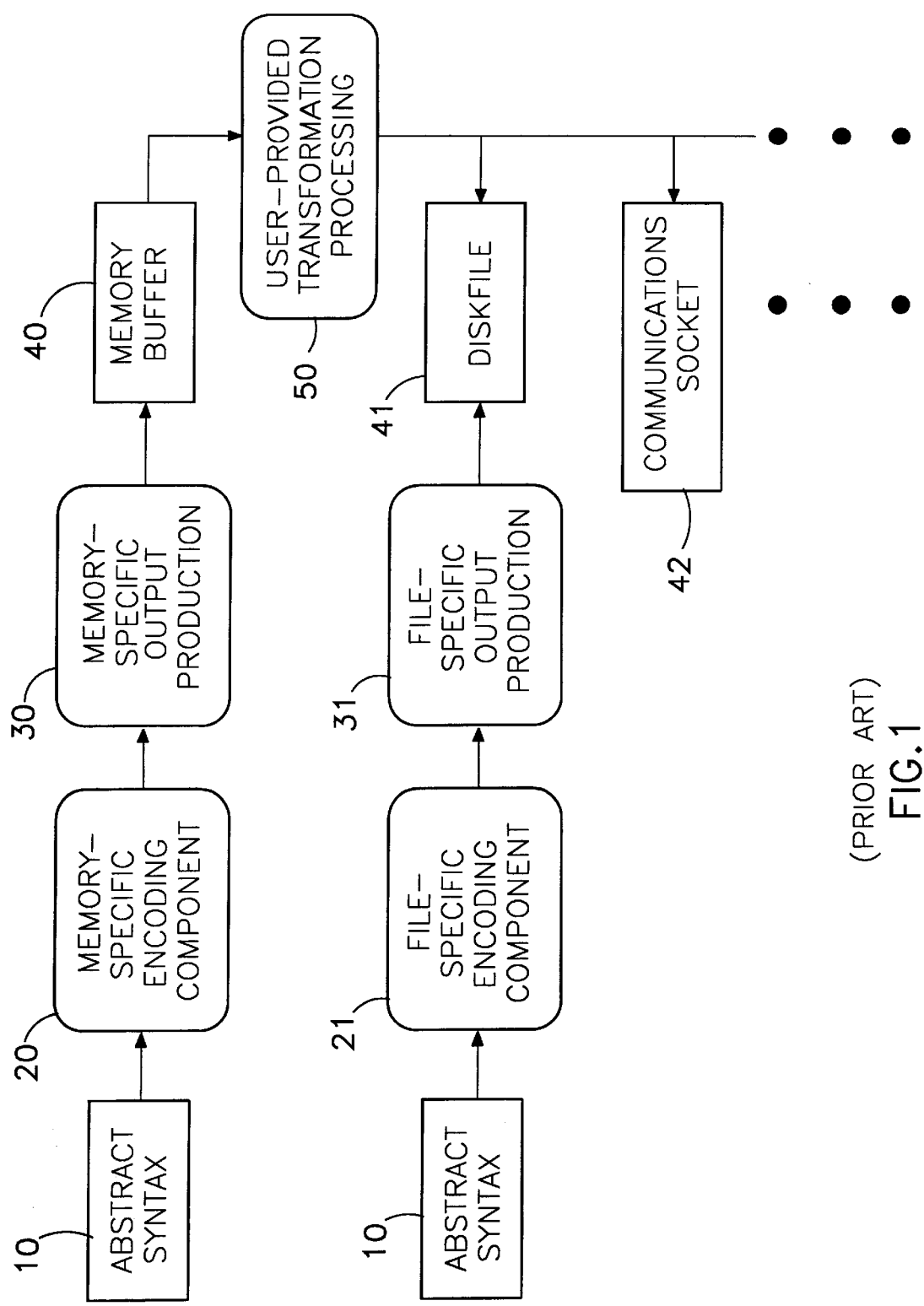
FIG. 1 shows a block diagram of a prior art metadata encoding engine.
Figure 2:
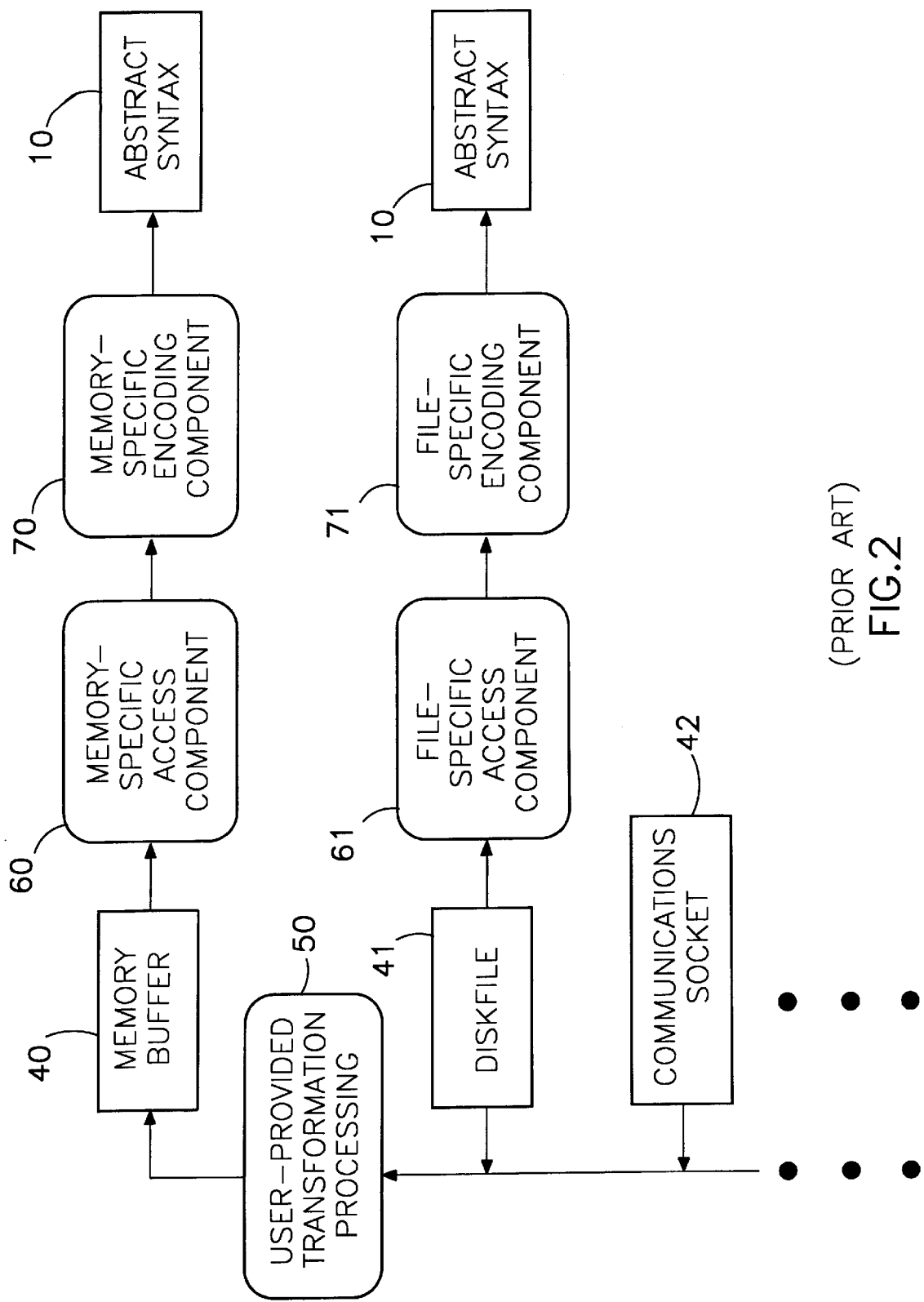
FIG. 2 shows a block diagram of a prior art metadata decoding engine.

The present invention is most clearly understood in terms of how it differs from prior art encoding/decoding engines, particularly its improvements in flexibility, reduced processing time, and reduced computer resources. FIGS. 1 and 2 show prior-art encoding and decoding engines, respectively.

As shown in FIG. 1, abstract syntax 10 (ASN.1) is encoded by a memory-specific encoding component 20, working through a memory-specific output production 30, and into memory buffer 40, which contains the transfer syntax. In the typical case, memory buffer 40 must be allocated prior to encoding, requiring the user to predetermine the required size to contain the encoding, or to allocate an arbitrarily large amount of memory. If the transfer syntax ultimately needs to be delivered to a transfer media other than a memory buffer, the options available in the prior art are limited.

Another encoding component and output production could be devised for the different transfer media. For example, in FIG. 1, a file-specific encoding component 21 working through a file-specific output production 31 produces the transfer syntax in a disk file 41. This method requires a different encoding component and output production be implemented for each different case, and the user is limited to those transfer media for which encoding and output production component are made available. The user can only overcome this limitation by devising his or her own transformation processing 50 to transform the memory buffer to the desired medium. This is similarly closed-ended, in that it requires custom transformation processing to be devised for each different medium to be supported. It is also inefficient, in that it is a two-step process, first producing a memory-buffer encoding and then copying and transforming it to the desired medium.

FIG. 2 shows the prior art decoding engine, which suffers from equivalent limitations. Transfer syntax contained in a memory buffer 40 is decoded using a memory-specific decoding component 70 working through a memory-specific access component 60 in order to produce the abstract syntax 10. As with encoding, to access different media, such as disk file 41 or communications socket 42, requires either a different set of access and decoding component. FIG. 2 shows a file-specific access component 61 and file-specific decoding component 71. The other alternative available in the prior art is for the user to provide his own transformation processing 50 to transform from the actual medium of the transfer syntax into a medium for which decoding and access component are available to him. Again, this is a closed-ended and inefficient process.

2. The Preferred Embodiment

The present invention overcomes the limitations and inefficiencies inherent in the prior art by implementing the encoding/decoding engine in a manner such that a single implementation of the engine addresses an open-ended variety of transfer media. Thus, the engine implementor avoids providing several different engines for each different medium to be supported, and the engine user is not limited to a closed set of media, or reaching other media through inefficient transformations. This also eliminates the necessity of pre-allocating memory buffers by making self-extending memory buffers easily supportable. This is achieved in the preferred embodiment by employing a metadata-driven encoding/decoding engine having two templates, one for encoding and one for decoding, and a forward octet iterator for producing or accessing the transfer syntax in its appropriate medium.

Figure 3:
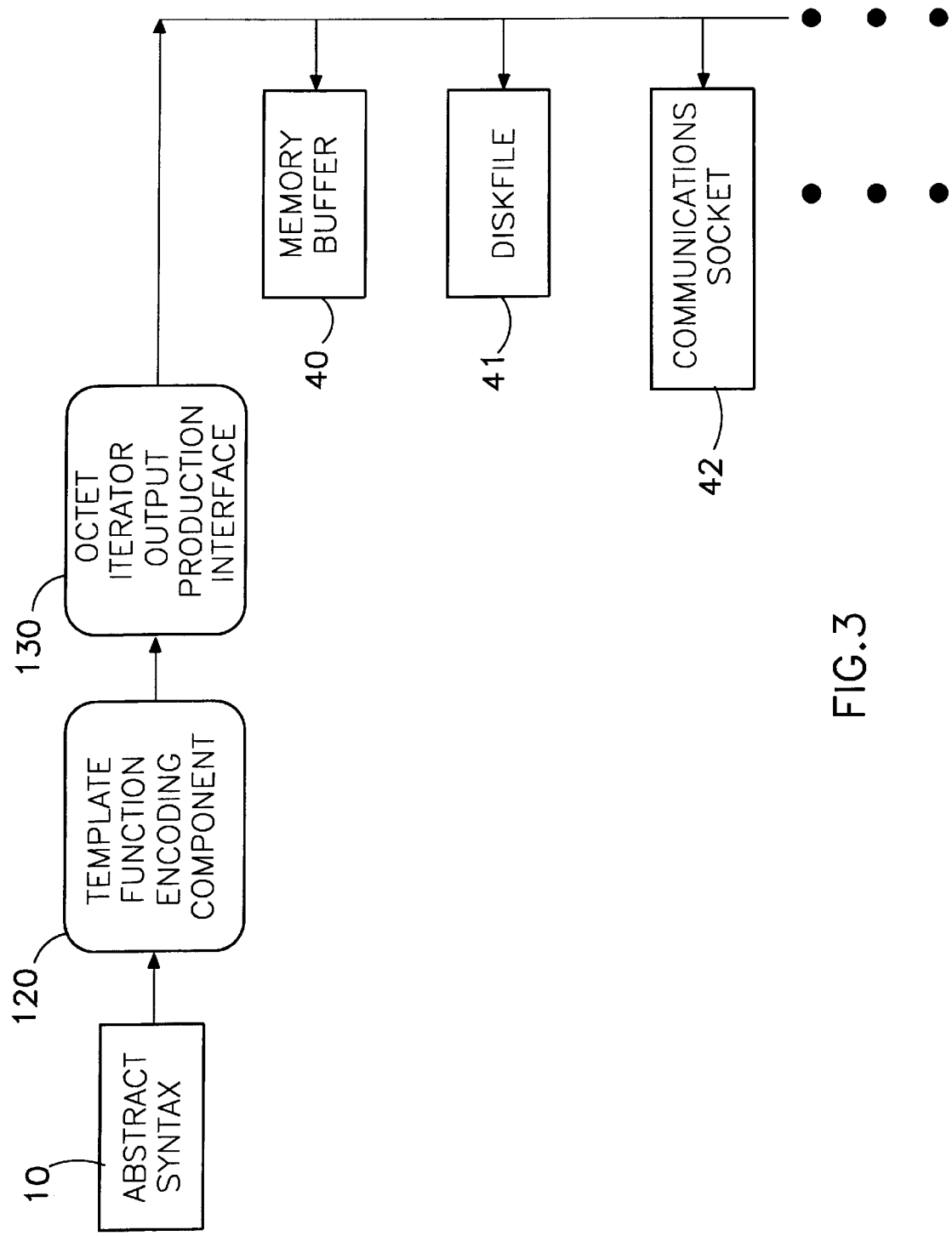
FIG. 3 shows a block diagram of the encoding and decoding engines for the present invention.

FIG. 3 shows the encoding engine. The abstract syntax 10 is encoded using the template function encoding component 120 working through the octet iterator output production interface 130, which produces the transfer syntax in a memory buffer 40, disk file 41, communications socket 42, or any other transfer medium that meets the very minimal requirements of the octet iterator interface. The simplicity and open-endedness of this embodiment can be observed in contrast to the prior art equivalent in FIG. 1. The specific encoding component (20, 21 in FIG. 1) and output production component (30, 31 in FIG. 1) are replaced with one general encoding interface (template function encoding component 120, shown in FIG. 3) and one output production component (octet iterator output production interface 130, shown in FIG. 3). This simplification allows the engine implementor to build one general engine, rather than several specific cases, reducing his software development and maintenance effort. This generalization offers the engine user an open-ended variety of transfer media, without requiring the additional development work and the run-time inefficiencies of medium transformation processing (50 in FIG. 1).

Figure 4:
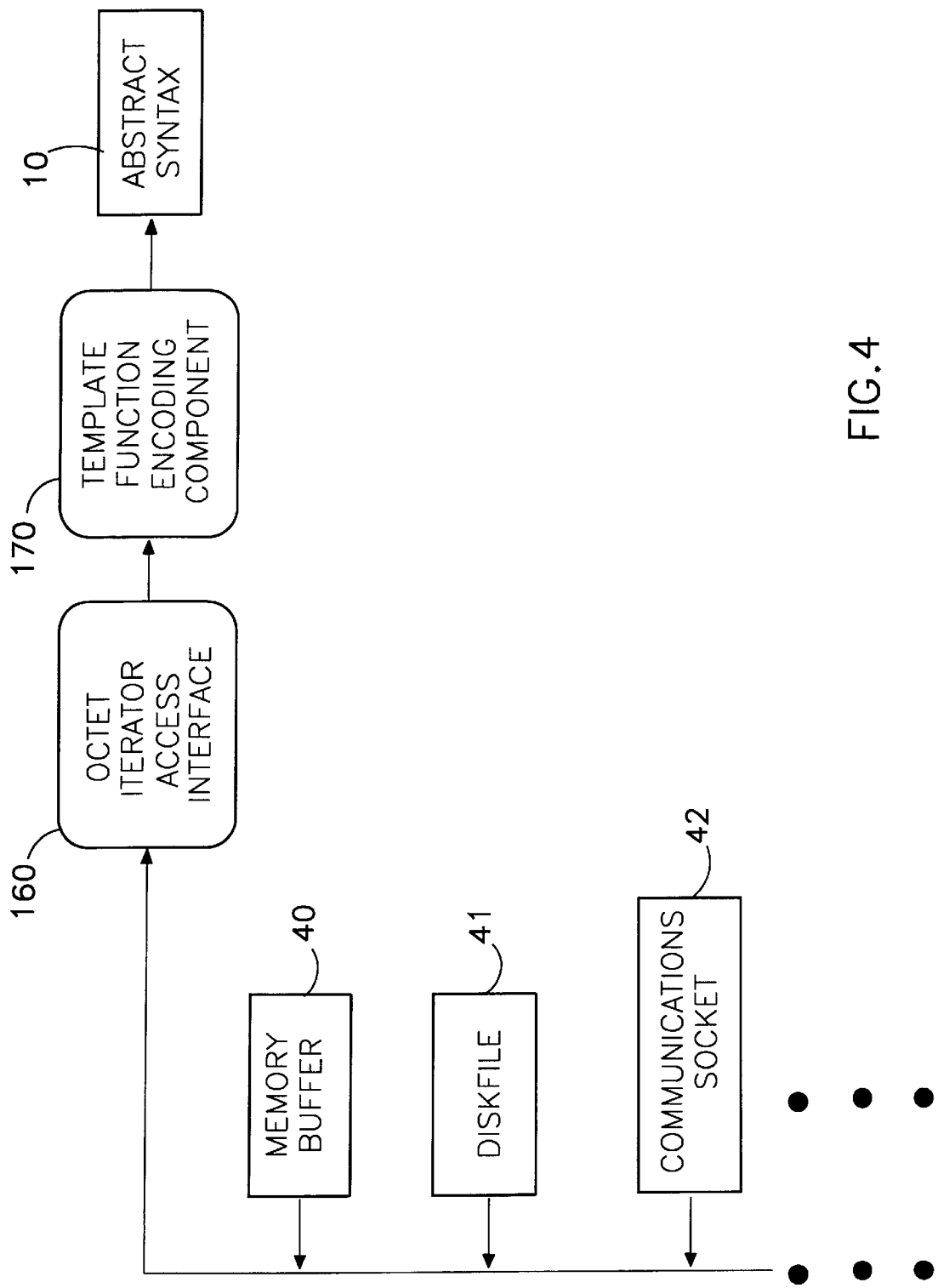
FIG. 4 shows a flow chart for the encoding engine for the present invention.

FIG. 4 shows the decoding engine. The template function decoding component 170, working through the octet iterator access component 160, can access the transfer syntax from a memory buffer 40, a disk file 41, a communications socket 42, or any other transfer medium that supports the octet iterator interface, to produce the abstract syntax 10. The simplification of the decoding engine may be seen by contrasting FIG. 4 with the prior art decoding engine shown in FIG. 2. The specific decoding component (70, 71 in FIG. 2) and access component (60, 61 in FIG. 2) are replaced with one general decoding component (function decoding component 170, shown in FIG. 4) and one access component (octet iterator access component 160, shown in FIG. 4). The benefits of this simplification to both engine implementors and engine users are equivalent to those for the encoding engine, including the elimination of the additional development work and run-time inefficiencies of medium transformation processing (50 in FIG. 2).

The benefits of these simplifications are enabled by the novel combination of an encoding/decoding component implemented as a set of template functions parameterized on a forward octet iterator interface to parameterize the transfer medium.

Figure 5:
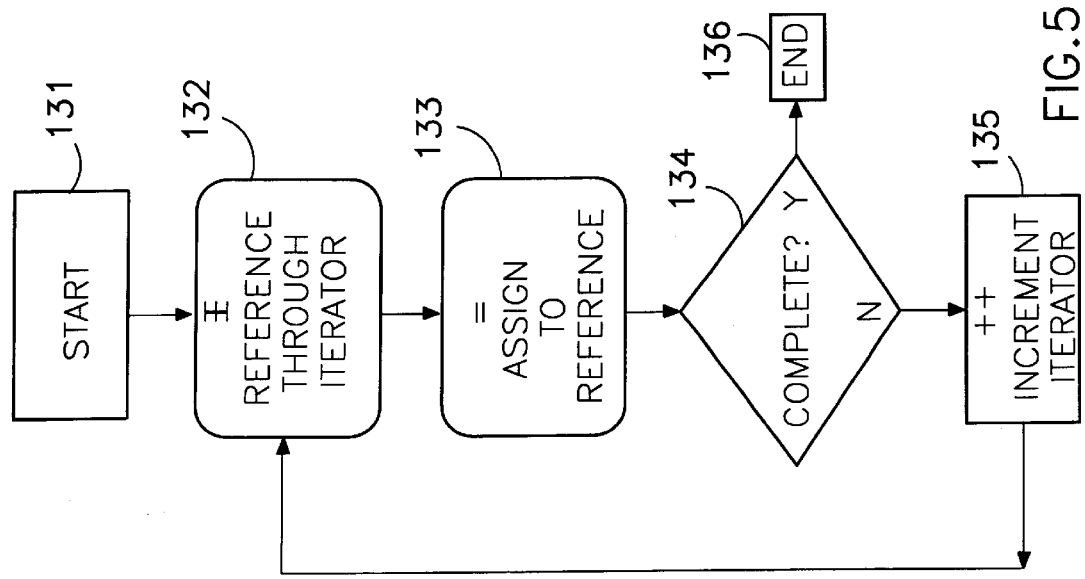
FIG. 5 shows a flow chart for the decoding engine for the present invention.

FIG. 5 shows in detail the forward output octet iterator interface employed in the encoding octet iterator output production interface 130 (shown in FIG. 3). The interface requires only three operations be provided by the transfer medium: reference (*), assignment (=), and increment (++). At the start 131 of the encoding process, reference operator 132 is applied to the iterator to access an octet location in the transfer medium, and assignment operator 133 produces an octet in the transfer medium. At decision 134, if the encoding engine signals that the encoding is complete, then the process ends 136. Otherwise, increment operator 135 is applied to the iterator to advance the transfer medium one octet, and the process repeats from step 132. In this manner, the encoding engine produces the transfer syntax as a sequence of octets, independent of the transfer medium.

Figure 6:
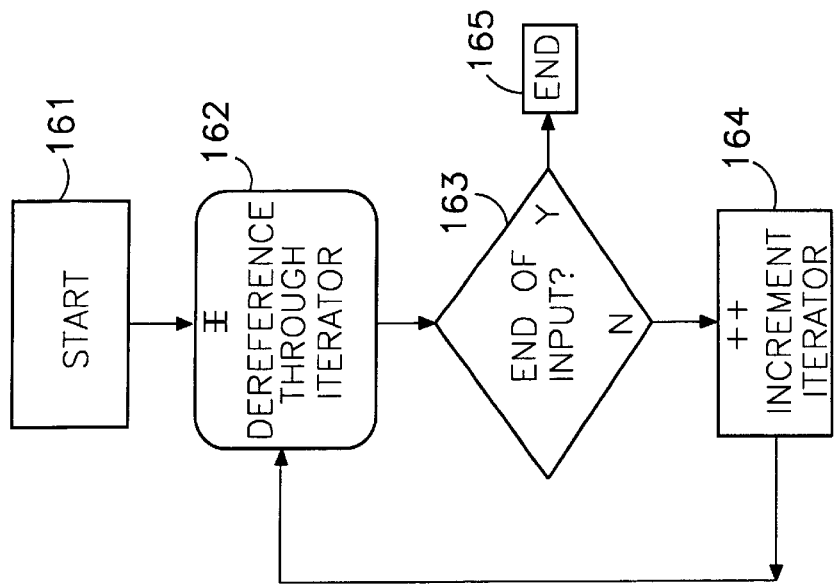
FIG. 6 shows a forward input octet iterator interface employed in the decoding octet iterator access interface.

FIG. 6 shows in detail the forward input octet iterator interface employed in the decoding octet iterator access interface 160 (shown in FIG. 4). The access interface requires only two operations be provided by the transfer medium: reference (*) and increment (++). At the start 161 of the decoding process, the dereference operator 162 is applied to the iterator to access an octet in the transfer medium. At decision 163, if the decoding engine signals that the decoding is complete, then the process ends 165. Otherwise, the increment operator 164 is applied to the iterator to advance the transfer medium one octet, and the process repeats from step 162. In this manner, the decoding engine accesses the transfer syntax as a sequence of octets, independent of the transfer medium.

The key feature of these iterator interfaces is that they keep the requirements on the transfer medium to an absolute minimum. Complete support of both encoding and decoding engines requires only three operators: reference (*), assignment (=), and increment (++). For example, a native memory buffer (unsigned char *) has these operators already built in, and it may be used directly by the encoding and decoding templates. Similarly, the standard C++ streams library provides these operations on ostream and istream objects, so these objects may be used directly by the encoding and decoding templates to access files, and other streamable media. Objects which do not provide these operators in their native form can be easily encapsulated in a class which provides these three operations. For instance, a Unix file descriptor or socket descriptor could be wrapped in a class which implements these three operators with the correct semantics. Because only three simple operators are required, the implementation work for such a class is minimal.

FIG. 7 shows the preferred embodiment as declared in the C++ language, with descriptive text.

The present invention may be used with other encoding/decoding engines, such as those that generate unique parser and formatter functions for each abstract type. However, each unique parser and formatter function would need to be templatized, requiring a cumbersome amount of different templates.

A forward output octet iterator is the preferred iterator interface, although other iterator interfaces (e.g., bi-directional or random-access) may also be employed. While the forward iterator may require some additional work in the implementation of the encoding/decoding component, it affords the greatest flexibility in terms of the varieties of input/output/storage mechanisms it can support because the forward iterator is the "lowest common denominator" iterator.

The forward iterator is the most restrictive on the implementation of the encoding/decoding component. For example, common encoding algorithms that produce encodings in reverse byte order would not be able to operate directly on a forward iterator, but would have to buffer their output or use some other intermediate mechanism. However, the forward iterator interface is the most flexible and permissive for the invoker of the template function. For example, direct socket output could be supported using a forward iterator interface, but socket output could not plug directly into a bidirectional or random-access iterator interface without some intervening mechanism.

Optional elements include optimized template specializations. In C++, specialized instantiations may be provided for template functions for when the template parameter is instantiated with a particular type. Thus in particular predetermined cases, an optimized implementation is provided while the template implementation handles the general case. For example, the basic forward iterator interface, which requires an operation for each byte, is not necessarily the most efficient, especially in cases where the encoding component could produce a block of bytes in one operation. Template specializations may be used to provide "smart" iterators that are not limited to the usual constraints of basic forward iterators, and to provide an optimized implementation of the encoding and decoding component to take advantage of these "smart" iterators when they are used as a template function parameter. Thus both general case implementations, having the benefit of being open-ended, and special case implementations, having the benefit of being optimized, may exist for the same template function. The C++ compiler links the appropriate implementation according to the type that was used as the parameter when the template function was invoked.

Additional advantages and modifications will readily occur to those skilled in the art. Thus while the preferred embodiment of the present invention has been disclosed and described herein, the invention in its broader aspects is not limited to the specific details, methods and representative devices shown and described herein. It will be understood by those skilled in the art that various changes in form and detail may be made therein without departing from the spirit and scope of the general inventive concept as defined by the appended claims and their equivalents.

What is claimed is:

1. An apparatus for encoding abstract syntax into transfer syntax on a transfer medium comprising:
   an encoding component having a template function with one parameter and that encodes abstract syntax into transfer syntax; and
   an iterator output interface;
   wherein the parameter of the template function of the encoding component designates the interface to the transfer medium, and the iterator output interface is the interface between the encoding component and the transfer medium through which the transfer syntax is produced.

2. The encoding apparatus according to claim 1 further comprising a specialized implementation of the template function to provide more efficient handling of special cases known in advance.

3. The encoding apparatus according to claim 1 in which the abstract syntax is defined using Abstract Syntax Notation One (ASN.1).

4. The encoding apparatus according to claim 3 in which the transfer syntax is defined by the encoding rules specified in ITU-T Recommendations X.690, X.691, X.692, or X.693.

5. The encoding apparatus according to claim 1 wherein the encoding component structures the transfer syntax as a stream of octets, and wherein the iterator output interface uses an octet as its unit of iteration.

6. The encoding apparatus according to claim 5 in which the abstract syntax is Abstract Syntax Notation One (ASN.1).

7. The encoding apparatus according to claim 6 further comprising a specialized implementation of the template function.

8. An apparatus for decoding transfer syntax from a transfer medium into abstract syntax comprising:
   a decoding component having a template function with one parameter and that decodes transfer syntax into abstract syntax; and
   an iterator input interface;
   wherein the parameter of the template function of the decoding component designates the interface from the transfer medium, and the iterator input interface is the interface between the decoding component and the transfer medium from which the transfer syntax is accessed.

9. The decoding apparatus according to claim 8 further comprising a specialized implementation of the template function to provide more efficient handling of special cases known in advance.

10. The decoding apparatus according to claim 8 in which the abstract syntax is defined using Abstract Syntax Notation One (ASN.1).

11. The decoding apparatus according to claim 10 in which the transfer syntax is defined by the encoding rules specified in ITU-T Recommendations X.690, X.691, X.692, or X.693.

12. The decoding apparatus according to claim 8 wherein the decoding component receives the transfer syntax as a stream of octets, and wherein the iterator input interface uses an octet as its unit of iteration.

13. The decoding apparatus according to claim 12 in which the abstract syntax is Abstract Syntax Notation One (ASN.1).

14. The decoding apparatus according to claim 13 further comprising a specialized implementation of the template function.

15. A system for encoding and decoding abstract syntax and transfer syntax onto and from a transfer medium comprising:
   an encoding component having a template function with one parameter and that encodes abstract syntax into transfer syntax;
   an iterator output interface;
   a decoding component having a template function with one parameter and that decodes transfer syntax into abstract syntax; and
   an iterator input interface;
   wherein the parameter of the template function of the encoding component designates the interface to the transfer medium, and the iterator output interface is the interface between the encoding component and the transfer medium through which the transfer syntax is produced; and
   wherein the parameter of the template function of the decoding component designates the interface from the transfer medium, and the iterator input interface is the interface between the decoding component and the transfer medium from which the transfer syntax is accessed.

16. The system according to claim 15 further comprising a specialized implementation of the template function to provide more efficient handling of special cases known in advance.

17. The system according to claim 15 in which the abstract syntax is defined using Abstract Syntax Notation One (ASN.1).

18. The system according to claim 17 in which the transfer syntax is defined by the encoding rules specified in ITU-T Recommendations X.690, X.691, X.692, or X.693.

19. The system according to claim 15 wherein the decoding component receives the transfer syntax as a stream of octets, and wherein the iterator input interface uses an octet as its unit of iteration.

20. The system according to claim 19 in which the abstract syntax is Abstract Syntax Notation One (ASN.1), and further comprising a specialized implementation of the template function.

* * * * *